L. RISK.
VEHICLE WHEEL.
APPLICATION FILED FEB. 1, 1915.

1,156,099.

Patented Oct. 12, 1915.

Witnesses:
M. L. Jennings.
W. H. Bruns.

Inventor,
Loren Risk, by
G. C. Kennedy,
Attorney.

UNITED STATES PATENT OFFICE.

LOREN RISK, OF WATERLOO, IOWA.

VEHICLE-WHEEL.

1,156,099.   Specification of Letters Patent.   Patented Oct. 12, 1915.

Application filed February 1, 1915. Serial No. 5,477.

*To all whom it may concern:*

Be it known that I, LOREN RISK, a citizen of the United States of America, and a resident of Waterloo, Blackhawk county, Iowa, have invented certain new and useful Improvements in Vehicle-Wheels, of which the following is a specification.

Figure 1:
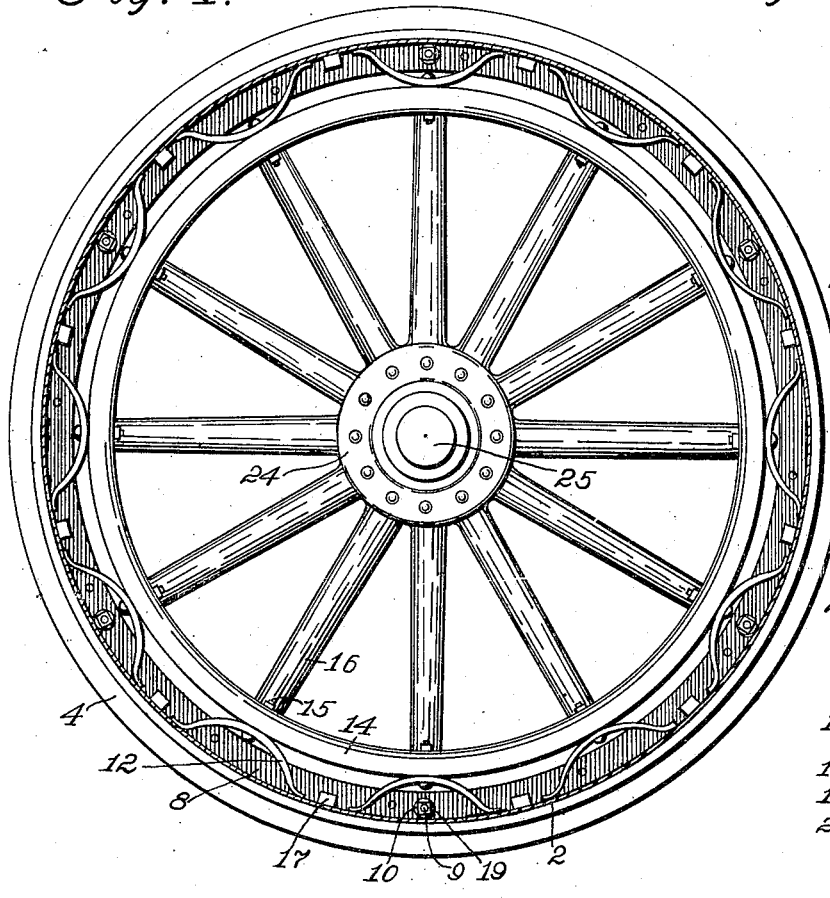
Figure 2:
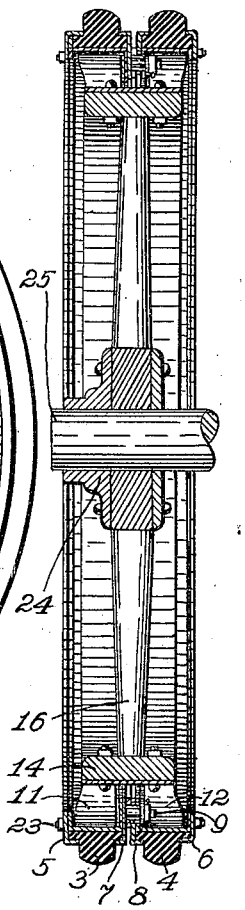
Figure 3:
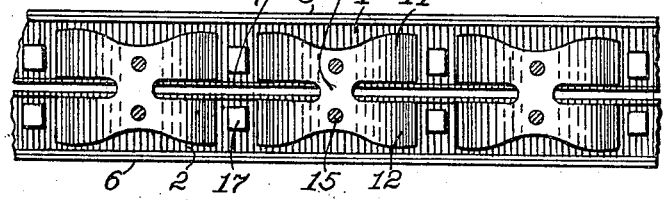
Figure 5:
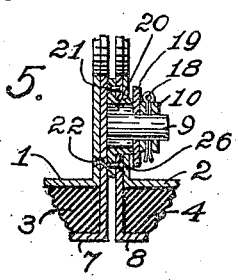
Figure 4:
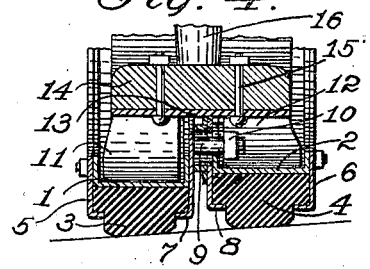

My invention relates to improvements in vehicle wheels, and the objects of my improvements are, first, to provide a rigid wheel with a tire-carrying rim movably mounted thereabout in spaced relation concentrically and so movably and resiliently connected thereto as to permit of its partial rotation about it in either direction, and second, to form said outer tire-carrying rim in two like parts arranged side by side, so connected and adapted to each other and to said wheel as to permit them to conform themselves to the lateral slope or irregularities of the surface moved over. These objects I have accomplished by the means which are hereinafter described and claimed, and which are illustrated in the accompanying drawings, in which:

Figure 1 is a side elevation of my improved vehicle wheel, with parts removed or sectioned away. Fig. 2 is a vertical axial transverse section of said vehicle wheel. Fig. 3 is a development in plan on a plane surface of portions of the inner circumferential peripheries of the outer tire-carrying rims, showing the H-shaped springs operatively associated therewith. Fig. 4 is an enlarged detail transverse section of the tread part of said wheel, including the inner and outer rims and the intermediate and associated structures. Fig. 5 is a fragmentary transverse section, on an enlarged scale, of the movably linked parts of the outer tire-carrying rims.

Similar numerals of reference denote corresponding parts throughout the several views.

In the drawings, I have shown a vehicle-wheel whose axle 25 is mounted in a hub 24, carrying spokes 16 and a concentric solid inner rim 14. About the outer circumferential periphery of said rim, which is relatively broad and flat H-shaped plate springs, medially bowed inwardly, are secured opposite said spokes, and equally spaced apart about the rim. These springs are secured by bolts 15 to said rim.

The numerals 1 and 2 denote like annular outer but inwardly-channeled tire-carrying rims, whose adjacent inner flanges are wider than their outer flanges. The solid rubber tires 3 and 4 are fitted upon the outer circumferential peripheries of the rims 1 and 2, and are detachably secured thereon by the flanged annular plates 5 and 7, and 8 and 6, respectively, the plates 5 and 6 being detachably secured upon the outer flanges of the rims 1 and 2 by means of bolts 23, while the inner flanges of said rims 1 and 2 are fixedly secured to the inner annular plates 7 and 8 by means of flush-head rivets 22. The inner edges of the connected flanges of said rims 1 and 2 and said plates 7 and 8 are spaced apart from the outer surface of the rim 14 to provide for sufficient play of the outer rims to and from said inner rim. I have adopted the following movably-connected linking-means for the said plates 7 and 8 of said outer rims 1 and 2, adapted to allow said rims to move relative to each other in any direction within like planes perpendicular to the surface moved over: Each annular plate 7 and 8 has a like number of circular orifices 26 of relatively large aperture, and each adapted to receive the hollow sleeve part of an annular spacer plate 7, as the case may be, by means of flush-headed rivets 21. The plates 7 and 8 are spaced apart a very short distance so as not to frictionally contact with each other, but the outer faces of said spacer-plates serve as rubbing or spacing-means for the plates 7 and 8 to preserve a constant distance between them while permitting relative movements accompanied by a minimum of friction. Pins 9 are fixedly mounted on the plates 7 and 8 to pass through the hollows of the sleeve-parts of the spacing-bodies 20 and extend therebeyond a sufficient distance to permit of a washer 19 and nut 10 being mounted on each, the nut being locked by means of a split-key 18 passed through registering orifices in the nut and said pin. Since the diameter of the pin 9 is much less than the interior diameter of the sleeve 20, the pin is free to be moved in any direction toward the walls of said sleeve, to permit like displacement of one rim 1 or 2 relative to the other.

Referring now to Figs. 1 and 3, each H-shaped spring is composed of oppositely-directed pairs of spaced like parallel limbs or members 11 and 12, connected medially transversely by in integral tie 13. The springs are preferably diminished in thickness from their middles toward the extremities of their members, but are usually formed narrower at the middle than at their extremities in order to have an increased bearing on the outer rims 1 and 2. The members 11 and 12 are located on outer sides of the inner flanges of the rims 1 and 2 so as to be close thereto if not in contact therewith, and thus, as shown in said Fig. 3, act to limit the movement apart of said rims laterally. The outer rims are therefore movably linked together by the first-mentioned securing-means and also are linked or connected to the inner rim 14 by the contacts of said springs with outer parts of the outer rims' inner flanges, as also by the occasional contacts of the spring extremities with the bosses 17, fixed on the inner circumferential peripheries of the rims 1 and 2 midway between the adjacent springs, but spaced apart from their abutting extremities.

The wheel shown in Fig. 1 is not under load, and its movably-connected parts are therefore concentric and symmetrically distributed relative to each. When under load, and in moving rotation in either direction, the following mutual interactions of said parts will occur in degrees of varying extent: In rotating, there is differential movement between the inner rim 14 and the outer pair of tire-carrying rims 1 and 2 in such wise, that like ends of the spring-members 11 and 12 will contact with the adjacent stops or bosses 17, so that a yielding resilient action is obtained on the contacting members only of each spring equally about the circumferential outer periphery of the rim 14. This is in addition to the up and down yielding resilient action of the springs due to oscillation while under load or caused by irregularities in the surface traveled over. The wheel is therefore wholly resilient in its tread and action forward or back.

Referring now to said Fig. 4, which represents the conformity of the tire-treads to the surface moved over, it will be seen that since the outer rims 1 and 2 are movably linked together so that they are permitted relative movements to each other perpendicular to said supporting surface, that the tires 3 and 4 are enabled at all times to bear equally upon said surface, whether sloping laterally as shown, or otherwise; this gives a maximum adhesion and draft, with less liability to skid or overturn.

Minor changes in the form, dimensions, materials or relations of the parts of said device may be made, without, however, departing from the principles of or the scope of the protection of this invention.

Having described my invention, what I claim as new, and desire to secure by Letters Patent, is:

1. In combination, a wheel center having a rim, a pair of tires mounted independently about said rim, and a plurality of H-shaped arciform plate-springs medially secured in spaced relation to each other upon the said rim and having their spaced ends bearing yieldingly against the said tires, and means on said tires for limiting the rotation thereof relative to said rim and said springs.

2. In combination, a wheel center having a relatively wide rim, a pair of narrower outer rims mounted about said wide rim and spaced therefrom, each narrower rim having tire-retaining means, and having inwardly-directed flanges on their adjacent parts, connecting-means between said flanges permitting limited movements to each relative to the other, spaced stops mounted about the inwardly-directed faces of said outer rims, and H-shaped plate-springs mounted on the outer face of the said wide rim, with their spaced members seated astride the said inwardly directed flanges of the outer rims to limit transverse movements thereof relative to the wide rim, the extremities of the said spring-members bearing yieldingly against the inner rims adjacent to but spaced from said spaced stops thereon.

3. In combination, a wheel-rim, a pair of outer rims located side-by-side about and spaced from said wheel-rim, each of said outer rims having means adapted to detachably secure a tire thereon, and each having an inwardly-directed flange, said flanges being located adjacent to each other, and plate-springs secured to the said wheel-rim and having their free ends yieldingly contacting with said outer rims, each spring being divided into members set astride the flanges of the outer rims to limit lateral movements of said rims relative to said wheel-rim.

Signed at Waterloo, Iowa, this 23rd day of Jan. 1915.

LOREN RISK.

Witnesses:
PEARL STANTON,
GEO. C. KENNEDY.

Copies of this patent may be obtained for five cents each, by addressing the "Commissioner of Patents, Washington, D. C."